(12) United States Patent
Lin et al.

(10) Patent No.: US 9,063,270 B2
(45) Date of Patent: Jun. 23, 2015

(54) LIGHT-UNIFORMING ANTI-GLARING STRUCTURE AND LIGHT-EMITTING DEVICE

(75) Inventors: Chao-Ying Lin, New Taipei (TW); Jen-Huai Chang, Taoyuan County (TW)

(73) Assignee: EXTEND OPTRONICS CORP., Taoyuan County (TW)

( * ) Notice: Subject to any disclaimer, the term of this patent is extended or adjusted under 35 U.S.C. 154(b) by 713 days.

(21) Appl. No.: 13/239,385

(22) Filed: Sep. 21, 2011

(65) Prior Publication Data
US 2012/0162960 A1    Jun. 28, 2012

(30) Foreign Application Priority Data
Dec. 22, 2010  (TW) ............................... 99145293 A (51) Int. Cl.
| F21V 9/14 | (2006.01) |
|---|---|
| G02B 5/02 | (2006.01) |
| F21S 6/00 | (2006.01) |
| F21Y 101/02 | (2006.01) |
| F21Y 105/00 | (2006.01) |

(52) U.S. Cl.
CPC ............... *G02B 5/0242* (2013.01); *F21S 6/002* (2013.01); *F21V 9/14* (2013.01); *F21Y 2101/02* (2013.01); *F21Y 2101/025* (2013.01); *F21Y 2105/00* (2013.01); *F21Y 2105/008* (2013.01)

(58) Field of Classification Search
CPC .................... G02F 1/133528; G02F 1/133711; G02F 1/1336; G02B 5/30; G02B 5/3025; G02B 5/305; G02B 5/3083; G02B 6/0055; G02B 5/0242; B32B 33/00; F21V 9/14; F21V 14/04; F21V 17/02; H01S 5/141; H01S 5/4012; H01S 5/4087; F41H 13/0087; F21Y 2101/02; F21Y 2105/008; F21Y 2101/025; F21Y 2105/00; F21S 6/002
USPC ............ 362/97.1, 19, 514, 512, 319, 18, 310, 362/324, 523; 359/483.1; 427/162, 163.1; 349/96; 33/286; 126/600; 343/763, 343/766, 839; 356/491; 372/9
See application file for complete search history.

(56) References Cited

U.S. PATENT DOCUMENTS

| 5,422,756 A  * | 6/1995 | Weber ....................... 359/485.03 |
|---|---|---|
| 6,018,419 A  * | 1/2000 | Cobb et al. ............... 359/485.04 |
| 2003/0164905 A1* | 9/2003 | Yamaoka et al. ............... 349/95 |
| 2005/0036334 A1* | 2/2005 | Pederson ....................... 362/545 |

* cited by examiner

*Primary Examiner* — Stephen F Husar
*Assistant Examiner* — Danielle Allen
(74) *Attorney, Agent, or Firm* — Li & Cai Intellectual Property (USA) Office (57) ABSTRACT

A light-uniforming anti-glaring structure includes a light-polarizing reflection unit and a light-polarizing position adjusting unit. The light-polarizing reflection unit includes a multilayer reflector composed of a plurality of inter-stacked polymer films. One of the inter-stacked polymer films is a birefringence material layer that conforms to the condition of $NX \neq NY \neq NZ$, wherein NX is the index of refraction of light at X direction, NY is the index of refraction of light at Y direction, and NZ is the index of refraction of light at Z direction. The light-polarizing position adjusting unit is coupled with the light-polarizing reflection unit for adjusting the position of the light-polarizing reflection unit.

21 Claims, 6 Drawing Sheets

LIGHT-UNIFORMING ANTI-GLARING STRUCTURE AND LIGHT-EMITTING DEVICE

BACKGROUND OF THE INVENTION

1. Field of the Invention

The instant disclosure relates to a light emitting device; in particular, to a light emitting device with a light-uniforming anti-glaring structure.

2. Description of Related Art

Light emitting diode (LED), having the advantage of being energy efficient and long lasting, is the inevitable source for lighting in the foreseeable future. However, LED is a spot light source that generates focused light output and therefore easily leads to user discomfort due to direct glare formed from excessive brightness, especially in cases when such light source is utilized as a table lamp. Furthermore, whether traditional light source or other prior LED module all possesses issues of direct glare or reflective glare, which affects the viewing comfort of users when observing objects under such lighting condition. For table lamps, there are 3 types of common glares: direct glare, contract glare, and reflective glare. Direct glare is caused by directly viewing a focused and intense light source, such as directly looking at the sun during day-time, an incoming car lamp during night-time, or a light tube while reading with a table lamp. Contrast glare is caused by excessive difference of lighting ratio from two difference light source, such as a table lamp and a ceiling lamp. Reflective glare is caused by a reflective light, and is the most common type of glare which also has the most effect on viewing comfort; this is because the angle of incident (the incident angle of light projecting onto the reading material) and the angle of reflection (the reflection angle of light reflecting into the eye) are equal, so that under normal viewing angle such type of glare is unavoidable.

Reflective glare makes the image blurry, reading difficult, causes eye strain, reduces reading efficiency, and even leads to soreness in the eyes and head-ache. According to research report, every four out of five workers suffer from discomfort of the eyes, and the majorities have symptoms of head-ache, fatigue, and lacrimation. According to statistics, among students with intense learning pressure, 55.9% of the interviewee expressed issues of eye soreness, lacrimation, and discomfort that lead to the undesirable action of rubbing one's tender eyes.

On the issue of how to improve the discomfort caused by reflective glare, prior art anti-glare structure of the current market can be grouped into three types: anti-glare film, anti-glare reflective mask, and light divider.

Therein firstly, the anti-glare film works by placing a reflective filter film at the emitting direction of the light source, so as to enable vertical light beam to pass through due to the reflective filter film, which converts horizontal glare into vertical light beam, and thereby reduces reflective glare. This type of reflective anti-glare film would often be coupled with a light transmitting optical strip, so as to spread the light uniformly through the light transmitting optical strip, and since the user would not see the light tube directly, thereby direct glare is reduced. However during the reflective process such reflective filter film causes some of the light to weaken, and therefore the efficiency of light emitting device and overall brightness is reduced.

Secondly, the anti-glare reflective mask works by placing a reflective mask outside the light source, so that the reflective mask may direct the light source to vertically project light upon a table surface, and ensures that the reflected light does not shine directly into a user's eyes, and thereby reduces reflective glare. Usually a diffuser is used in conjunction so as to convert direct light into diffused light, so that the user would not see the light tube directly and thereby reduces direct glare. However using the anti-glare reflective mask reduces light emitting range and increases the difficulty of design and production, furthermore the utilization of diffuser reduces the overall efficiency of light emitting device.

Lastly, the light divider works by placing a light dividing structure outside the light source, which not only prevents glare, but also adjusts light source into effective intensity, and so increases a light source's output efficiency. However using the light divider reduces light emitting range and the overall light efficiency of light emitting device.

SUMMARY OF THE INVENTION

The instant disclosure is to provide a light-uniforming anti-glaring structure and light emitting device, which adjusts for conditions of light polarization caused by light beams traveling through a multilayer reflector.

The instant disclosure provides an embodiment of the instant disclosure, a light-uniforming anti-glaring structure is provided, which includes: a light-polarizing reflection unit and a light-polarizing position adjusting unit. The light-polarizing reflection unit includes at least one multilayer reflector that is composed of a plurality of inter-stacked polymer films, wherein at least one layer of the inter-stacked polymer films is a birefringence material layer that conforms to the condition of $NX \neq NY \neq NZ$, such that NX is the index of refraction of light at X direction, NY is the index of refraction of light at Y direction, and NZ is the index of refraction of light at Z direction. Generally speaking, as the wavelength of light varies, the refraction rate also varies, which accounts for the dispersion characteristic commonly seen in materials. The light-polarizing position adjusting unit, coupled to the light-polarizing reflection unit, is for adjusting the position of the light-polarizing reflection unit.

The instant disclosure provides an embodiment of the instant disclosure, a light emitting device is provided, which includes: a light emitting unit, a reflection unit, a light-polarizing reflection unit, and a light-polarizing position adjusting unit. The light-polarizing reflection unit at a side of the light emitting unit, so as to selectively receive or reflect the light beams produced by the light emitting unit, wherein the light-polarizing reflection unit comprises at least one multilayer reflector composed of a plurality of inter-stacked polymer films, wherein at least one layer of the inter-stacked polymer films is a birefringence material layer; which at specific wavelength, such as wavelengths between 380 nm and 780 nm visible light spectrum, conforms to the condition of $NX \neq NY \neq NZ$, such that NX is the index of refraction of light at X direction, NY is the index of refraction of light at Y direction, and NZ is the index of refraction of light at Z direction. Therein, the refraction rate of each direction can be measured with the prism coupler principle. The wavelength of 380 nm~780 nm described in the instant disclosure refers to commonly visible wavelength range, but as the ocular structure of each individual may vary in perception of light wavelength, visible light spectrum may shift slightly greater or short in wavelength. The light-polarizing position adjusting unit is coupled to the light-polarizing reflection unit, for adjusting the position, rotation angle, and direction of the light-polarizing reflection unit.

As described supra, through the light-uniforming anti-glaring structure provided by an embodiment of the instant disclosure, adjustment for conditions of light polarization caused by light beams traveling through multilayer reflector is achieved, and thereby the effect of glare upon a user is greatly decreased.

In order to further the understanding regarding the instant disclosure, the following embodiments are provided along with illustrations to facilitate the disclosure of the instant disclosure.

BRIEF DESCRIPTION OF THE STRETCHINGS

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended figures.

Figure 1A:
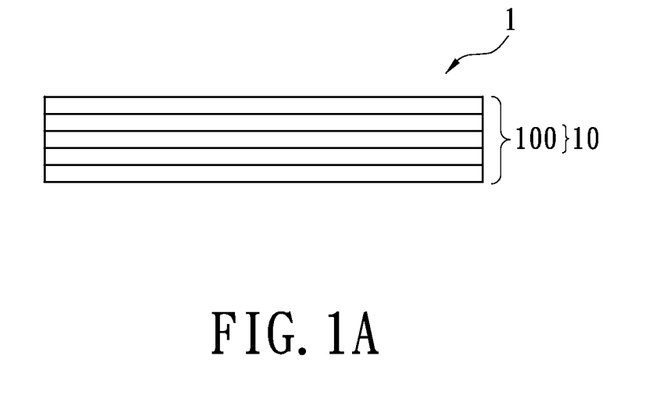
FIG. 1A shows a side-view diagram of a light-polarizing reflection unit according to a first embodiment of the instant disclosure.
Figure 1B:
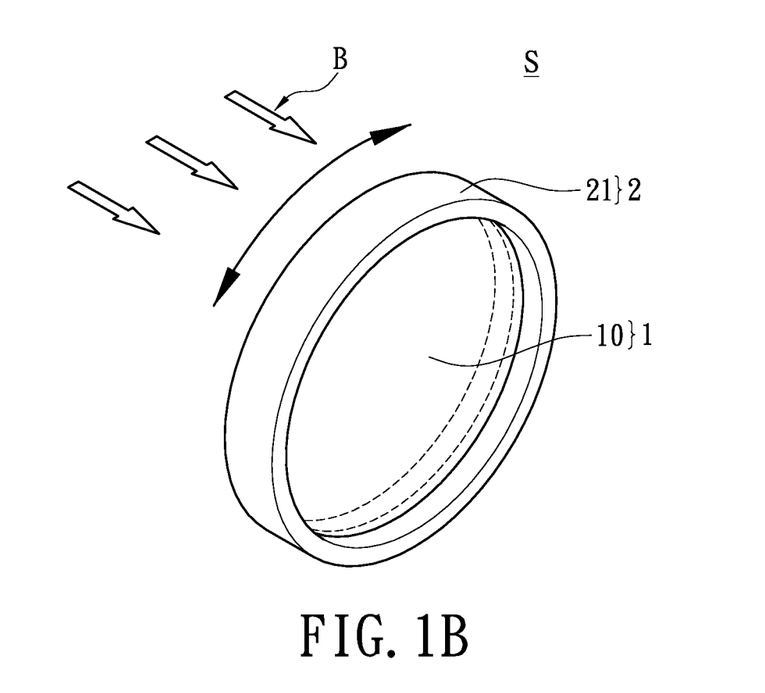
FIG. 1B shows a perspective diagram of a light-uniforming anti-glaring structure utilizing a first type of light-polarizing position adjusting unit according to the first embodiment of the instant disclosure.

See FIGS. 1A and 1B, the first embodiment of the instant disclosure provides a light-uniforming anti-glaring structure S, which includes: a light-polarizing reflection unit 1 and a light-polarizing position adjusting unit 2.

Therein, the light-polarizing reflection unit 1 includes at least one multilayer reflector 10 composed of a plurality of inter-stacked polymer films (as shown in FIG. 1A), wherein at least one layer of the inter-stacked polymer films 100 is a birefringence material layer that conforms to the condition of $NX \neq NY \neq NZ$, such that NX is the index of refraction of light at X direction, NY is the index of refraction of light at Y direction, and NZ is the index of refraction of light at Z direction. Furthermore, according to different operating needs, the plurality of inter-stacked polymer films 100 can be manufactured with thicker protection layer at its top or bottom surface, so as to protect the internal layers of the polymer films 100. At least one layer of the inter-stacked polymer films 100 is a ultra-violet reflector for reflecting ultra-violet lights, and can furthermore include a layer of infrared reflector for reflecting infrared lights. The ultra-violet reflector or infrared reflector can be composed of single-layer optical film or multi-layer optical films; which can be manufactured with multi-layer polymer films, and there can also be additions of metal oxide particles or ultra-violet absorbent; and can be placed via lamination on any surface of the inter-stacked polymer films 100 through coating, extrusion or ultra-violet paste curing. Other function layers can be added for the inter-stacked polymer films 100, such as locating a structure layer for increasing the strength and resilience, a protection layer for increasing resistance to scratch, a Nano-layer with self-cleansing effect, or locating a micro structure layer with convergence, diffraction, or diffusion capability on any surface of the inter-stacked polymer films 100. The optical micro structure layer with specific optical effect can be prism shaped, pyramid shaped, hemisphere shaped, aspheric shaped, Frensel lens shaped, lenticular, or grating structured. The optical micro structure layer located on the surface of the inter-stacked polymer films 100 can produce effects of blending, convergence, diffraction, and scattering. Furthermore, the multilayer reflector 10 can be formed through single-axial or bi-axial stretching, so that the average transmittance rate of the multilayer reflector for light spectrum 380 nm~780 nm is selectively between 30% and 90%, thereby effectively controls the intensity of light. Also, when the multilayer reflector 10 is formed through bi-axial stretching, then according to differences in usage needs, the multilayer reflector 10 can selectively be polarized or non-polarized.

For example, the structure of the multilayer reflector 10 is formed through many layers of material stacked in sequence of refraction rate, such as shown in FIG. 1A of the inter-stacked polymer films 100; in actuality the number of layers formed by all the inter-stacked polymer films 100 so as to make the multilayer reflector 10 can be ranged from the tens to hundreds. FIG. 1A is merely a schematic representation of the multi-layer structure, and does not show structure layers in the hundreds, and these tens to hundreds layers of inter-stacked polymer films 100 are composed of at least two types of material inter-changing in sequence; wherein the material of one of the layer conforms to the condition of $NX \neq NY \neq NZ$, and the optical thickness (refraction rate times physical thickness) of each layer of the optical films results in phase difference. Specific phase difference is a necessary condition for generating optical interference. When the multiple layers of the inter-stacked polymer films 100 achieves the interference condition, light may reflect many times within the layers before exiting, which has the effect of uniforming light, and can reflect the reflected light which has the effect of light amplification. Through the overall thickness of the multilayer reflector 10, the material, and the extent of stretching during the manufacturing process, the optical characteristic can be varied, and so adjustment can be designed according to specific needs. The characteristic of the multilayer reflector 10 can be adjusted according to needs, such that via forming through single-axial or bi-axial stretching, the average transmittance rate of the multilayer reflector 10 for light spectrum 380 nm~780 nm can be selectively between 30% and 90%.

Furthermore, when a light source is composed of a variety of color (such as a light source formed from multi-color LED of red, green, and blue), often effects of color spot with uneven color mixture would occur, commonly known as moiré (MURA). The multilayer reflector 10 can utilize single-axial or bi-axial stretching formation, so as to effectively adjust P and S polarization pattern ratio; or utilize just the bi-axial stretching formation to generate lights that have no polarization pattern. When light is repeatedly reflected between multilayer reflector 10 and reflector (not shown), the optical path of the light is effectively lengthened, thereby the brightness uniformity and color uniformity for the light emitting device of the multilayer reflector 10 is increased, which leads to an effective decrease of the MURA phenomenon. Furthermore a surface structure can be located on any surface of the inter-stacked polymer films 100 which forms the internal part of the multilayer reflector 10. The surface structure not only provides physical structure characteristics of additional functionality such as anti-sticking and anti-scratching, but may also include a photo-catalyst layer or a self-cleansing layer that provides corresponding functionalities, such that when light beams enter the photo-catalyst layer then harmful environmental substances can be broken down. Besides specialized functionality, another function provided by locating a surface structure is to provide optical utility, such as providing structures that is prism shaped, pyramid shaped, hemisphere shaped, aspheric shaped, Fresnel lens shaped, or grating structured, or a combination thereof Simply stated, by locating a surface structure on the surface of inter-stacked polymer films 100, the optical effects of convergence, blending, diffraction, and scattering can be generated.

Other than the previous mentioned multilayer structure, in another embodiment, the multilayer reflector 10 further includes utilizing co-extrusion or coating for manufacturing the ultra-violet reflector, which can add transparent plastic particles or additives that reflects ultra-violet to produce ultra-violet reflector, so thereby the ultra-violet reflector is formed within the multilayer reflector 10. Reflecting ultra-violet light not only prevents eye damage and external exposure of objects to harmful rays, but such ultra-violet light that has been reflected by multilayers can also be used to increase the luminous efficiency of the light source. For example when a light source is of light emitting device that primarily uses photo-luminescence powder, a ultra-violet reflector can be located outside of the multilayer reflector 10 so as to increase the luminous efficiency of the light source. Other manufacturing methods for ultra-violet reflector includes: using multilayer sputtering or evaporation, or by coating or dipping so as to produce a ultra-violet resistance film on the multilayer reflector 10; or a base material (or substrate) can be coated then laminated with the multilayer reflector 10, so that some of the ultra-violet can be reflected by the multilayer reflector 10; wherein the ultra-violet reflector can be located at one or both side of the multilayer reflector 10, or located within the multilayer reflector 10.

During manufacturing process, especially while the multilayer reflector 10 is forming, the molecular chain and molecular orientation of the polymer internal structure can be varied through a stretching machine in a single-axial or bi-axial formation, so that its physical characteristic changes, and the parameter affecting the stretch formation includes stretching temperature, speed, scaling factor, contraction, formation path, and heat setting temperature and time.

If single-axial or bi-axial stretching formation is utilized, generally the scaling ratio of single-axial stretching is from 1.5 to 6 times, and possibly greater, which is dependent upon needs and film material. Therein the film material of the inter-stacked polymer films 100 includes polyethylene terephthalate (PET), polycarbonate (PC), tri-acetyl cellulose (TAC), polymethylmethacrylate (PMMA) particle, methyl-methacrylate styrene (MS), polypropylene (PP), polystyrene (PS), polymethylmethacrylate (PMMA), cyclic olefin copolymer (COC), polyethylene naphthalate (PEN), ethylene-tetrafluoroethylene (ETFE), polylactide (PLA), or a mix or polymerization of these materials thereof Those optical elements formed via single-axial stretching formation can have specific directional polarization effect, thereby be used to adjust polarized wavelength range for light.

If bi-axial stretching formation is utilized, the scaling factor for each axial can be different, and the stretching formation can be according to sequence or both axial simultaneously, so that besides able to adjust for wavelength range, P and S polarization pattern ratio of light passing through multilayer reflector 10 can also be managed, such that adjustment can be made to near non-polarized condition. This characteristic can be used cooperatively with other optical films, such as a diffusion membrane or amplification membrane, so that a light emitting device that uses multilayer reflector 10 can produce light that is more uniform, diffused, eliminates color difference, adjusts for polarization, adjusts for reflection, reduces moire (MURA), and can utilizes interference principle to adjust for specific wavelength range.

Furthermore, the light-polarizing position adjusting unit 2 is coupled with the light-polarizing reflection unit 1, so as to adjust the position of the light-polarizing reflection unit 1. For example, as shown by FIG. 1A and FIG. 1B, the light-polarizing position adjusting unit 2 includes a rotational adjustment mechanism 21 for driving the multilayer reflector 10 to rotate in 360 degrees. In other words, a user can rotate (as shown by the arrow in FIG. 1B) via the rotational adjustment mechanism 21, so as to freely rotate the multilayer reflector 10 in 360 degree range, so as to adjust for conditions of polarization of light beam B when it passes through the multilayer reflector 10. The rotational adjustment mechanism 21 can be used to timely adjust for the output direction of light beam B according to external environmental conditions, so that when a lamp itself is restricted by factors and cannot be easily moved, turned, rotated, or shifted, then the rotational adjustment mechanism 21 can easily adjust the direction of the multilayer reflector 10, so that the function of anti-glaring can be achieved with no need to reinstall or modify the installation position of the lamp at issue. Therefore maintenance cost can be reduced and the effect of glare to a user can be greatly decreased.

Figure 1C:
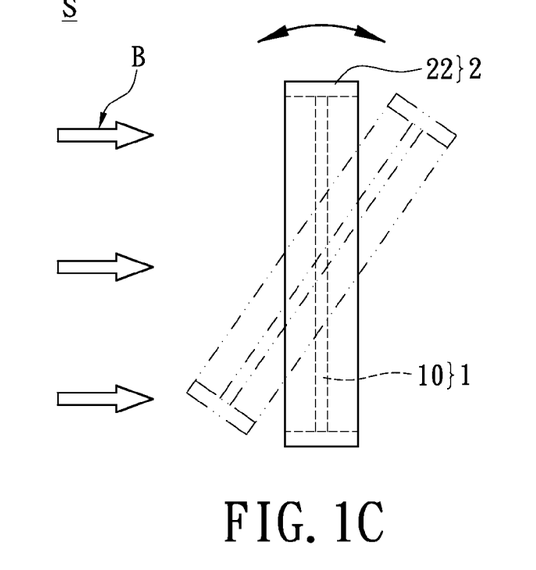
FIG. 1C shows a side-view diagram of a light-uniforming anti-glaring structure utilizing a second type of light-polarizing position adjusting unit according to the first embodiment of the instant disclosure.

In another example, as shown by FIG. 1A and FIG. 1C, the light-polarizing position adjusting unit 2 includes an inversion adjustment mechanism 22 for driving the multilayer reflector 10 to flip-flop clock-wise or counter-clock-wise. In other words, a user can flip-flop (as shown by the arrow in FIG. 1C) via the inversion adjustment mechanism 22, so as to freely flip the multilayer reflector 10 in clock-wise or counter-clock-wise direction, so as to adjust for conditions of polarization of light beam B when it passes through the multilayer reflector 10, and thereby greatly reduce the effect of glare on the user. The inversion adjustment mechanism 22 can vary the entrance direction of light, so that when the inter-stacked polymer films 100 of the multilayer reflector 10 has optical micro structure upon its surface, then effects of convergence, blending, scattering, or polarization can be achieved for a light beam B. For example, when surface structure is shaped like Fresnel lens or prism shaped, then inversion adjustment mechanism 22 would change the direction of light, thereby manages optical functions of adjusting light direction or light diffusion. As shown in FIG. 1E, when the inter-stacked polymer films 100 of the multilayer reflector 10 has Fresnel lens structure, prism structure, or grating structure upon its surface, then when the inversion adjustment mechanism 22 moves, then the direction of convergence for light beam B can be adjusted, and so the inversion adjustment mechanism 22 can thereby be used to manage the direction of light convergence for a lamp.

The functionality shown in FIG. 1B and FIG. 1C can be used conjunctively, such that for driving the multilayer reflector 10, the light-polarizing position adjusting unit 2 can simultaneously include a rotational adjustment mechanism 21 for rotating 360 degrees and an inversion adjustment mechanism 22 to flip-flop clock-wise and counter-clock-wise.

Figure 1D:
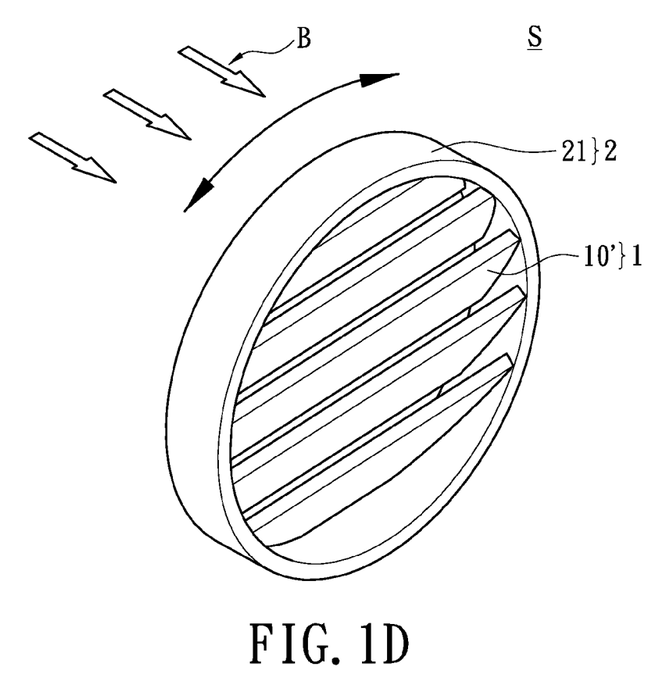
FIG. 1D shows a perspective diagram of a light-uniforming anti-glaring structure utilizing a third type of light-polarizing position adjusting unit according to the first embodiment of the instant disclosure.
Figure 1E:
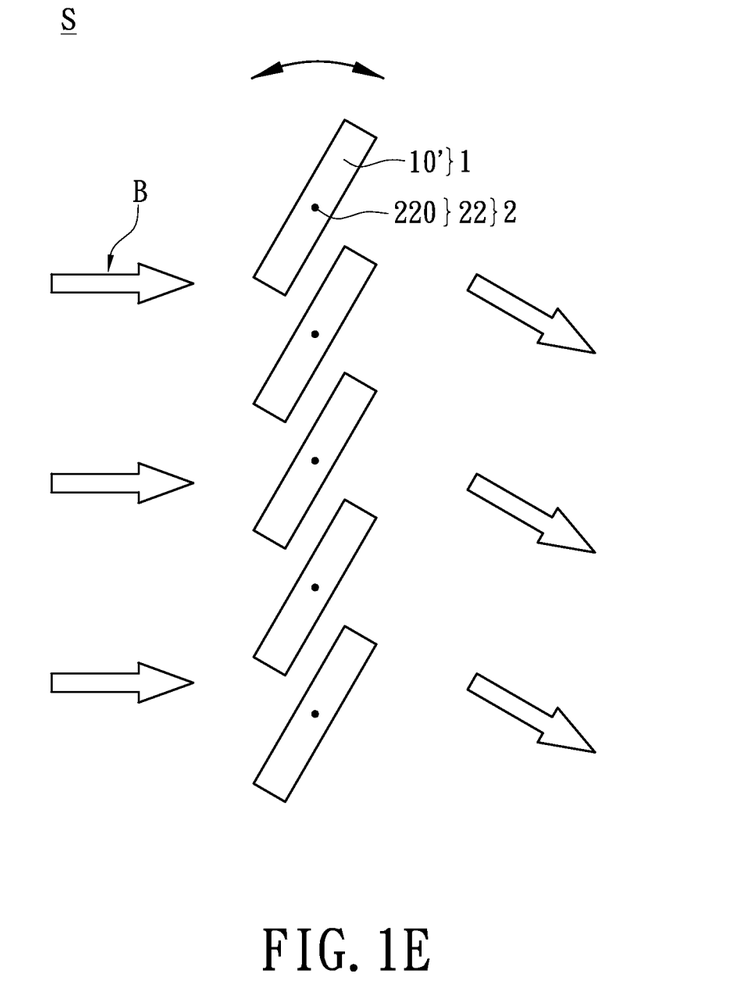
FIG. 1E shows a side-view diagram of a light-uniforming anti-glaring structure utilizing a fourth type of light-polarizing position adjusting unit according to the first embodiment of the instant disclosure.

In another example, as shown by FIG. 1A and FIG. 1D, the multilayer reflector 10 can be divided into a plurality of reflector strips 10', and the light-polarizing position adjusting unit 2 includes a rotational adjustment mechanism 21 for driving the plurality of reflector strips to rotate in 360 degrees. In other words, a user can rotate (as shown by the arrow in FIG. 1D) via the rotational adjustment mechanism 21, so as to freely rotate the reflector strips 10' in 360 degree range, so as to adjust for conditions of polarization of light beam B when it passes through the reflector strips 10', and thereby greatly reduce the effect of glare on the user. The set rotational angle of the reflector strips 10' in FIG. 1D can generate different gap sized and angle, wherein the appropriate gap size and angle can increase air's natural convection, so as to increase the effect of heat dissipation; furthermore the modification of the rotational angle of the reflector strip 10' can vary a lamp's light intensity and illumination, so that the surface of the reflector strip 10' can be set with a surface structure to achieve the functionality of convergence, blending, or diffusion. When set angle of the reflector strip 10' is near parallel with entering light beam B, the majority of light beam B will pass directly through and only a small portion of light beam B would strike the reflector strips 10', so that the anti-glaring effect worsens; this is especially true when light beam B is generated from a highly directional light source such as LED or laser.

In another example, as shown by FIG. 1A and FIG. 1E, the FIG. 1E is a side-view diagram, which shows that the multilayer reflector 10 can be divided into a plurality of reflector strips 10', and the light-polarizing position adjusting unit 2 includes an inversion adjustment mechanism 22 for driving the plurality of reflector strips 10' to flip-flop clock-wise or counter-clock-wise (i.e. the inversion adjustment mechanism 22 can be composed of a plurality of rotational axle, but the embodiment of the instant disclosure is not restricted thereby). In other words, a user can flip-flop (as shown by the arrow in FIG. 1E) via the inversion adjustment mechanism 22, so as to freely flip the reflector strips 10' in clock-wise or counter-clock-wise direction, so as to adjust for conditions of polarization of light beam B when it passes through the reflector strips 10', and thereby greatly reduce the effect of glare on the user. The reflector strips 10' can be set completely and immediately adjacent to one another, or can be set to generate different gap sized and separation, thereby utilizing the size of the gap to adjust for the amount of entering light, wherein the appropriate gap size and angle can increase air's natural convection, so as to increase the effect of heat dissipation; furthermore, the surface of the reflector strips 10' can be set with functional layers such as an anti-ultra-violet layer or infrared resistance layer, or a surface structure can be located on the surface so as to produce optical functionality of convergence, diffusion, polarization, or blending. As shown by FIG. 1E, when the set angle of the reflector strip 10' is near parallel with entering light beam B, the majority of light beam B will pass directly through and only a small portion of light beam B would strike the reflector strips 10', so that the anti-glaring effect worsens; this is especially true when light beam B is generated from a highly directional light source such as LED or laser; therefore there is a need to adjust the angle and direction of the reflector strips 10' so as to achieve a better anti-glaring effect.

The functionality shown in FIG. 1D and FIG. 1E can be used conjunctively, such that for driving the deflector strips 10', the light-polarizing position adjusting unit 2 can simultaneously include a rotational adjustment mechanism 21 for rotating 360 degrees and an inversion adjustment mechanism 22 to flip-flop clock-wise and counter-clock-wise.

[Second Embodiment]

Figure 2:
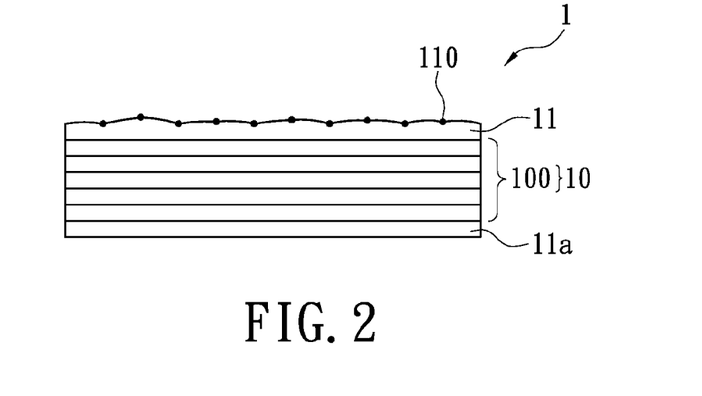
FIG. 2 shows a side-view diagram of a light-polarizing reflection unit according to a second embodiment of the instant disclosure.

Reference FIG. 2, the significant difference from the first embodiment (as shown by FIG. 1A) is that at least one surface (such as a first surface or a second surface) of the multilayer reflector 10 forms a surface structure 11, and the surface structure 11 is mixed with a plurality of diffusion particles 110. For example, the surface structure 11 that is mixed with a plurality of diffusion particles 110 can through any formation methods, form on the first surface or the second surface of the multilayer reflector 10. Thereby, the surface structure 11 mixed with a plurality of diffusion particles 110 can selectively form on the first or second surface of the multilayer reflector 10.

For example, FIG. 2 shows the multilayer reflector 10 on a surface (defined as a first surface) outside of the inter-stacked polymer films 100 formed a surface structure 11 via extrusion or coating. The surface structure 11 can generally be formed by micro structure of the length and width between 5 um~100 um; when the surface structure 11 utilizes grating or hologram nanostructures, nano-imprinting can also be used to imprint a length and width between 30 nm~5 um nanostructure to form the surface structure 11.

Furthermore, the first surface or the second surface of the multilayer reflector 10 can selectively locate a microstructure layer 11a, and the microstructure layer can be a self-cleansing layer or a photo-catalyst layer. When the primary function of the surface structure 11 is acting as the self-cleansing layer, then the size of the surface structure 11 is at around 30 nm~1000, so that when dirty liquid dampened the object surface, the original air-to-object surface contact is replaced by liquid-to-object surface contact, and the differences between air-to-object and liquid-to-object surface tension is referred to as wetting tension. When the air-to-object surface tension is greater than the liquid-to-object surface tension, meaning when the attraction between the physical object and the liquid is greater than the attraction between the physical object and air, the surface tension between the physical object and the air will stretch and extend the surface interface of liquid-to-object. In other words, when the dampened object surface has a lower surface tension, then liquid will expand upon the object surface. When liquid comes into contact with the object surface, the tangent angle between the object surface and the liquid is referred to as the contact angle. If the contract angle is small, such as when a water drop rest upon a glass plate, then the liquid will easily dampen the object surface. However, if the contract angle is great like when mercury drop rest upon a glass plate, then the liquid will have a hard time dampening the surface. The relationship between the wetting tension and the contact angle can be represented by Yong's equation: the air-to-object and liquid-to-object surface tension difference is equal to air-to-liquid surface tension multiplied by the cosine function of the contact angle. Considering two extreme situations, when the contact angle is 0 degree, then the liquid can completely dampen the object surface; when the contact angle is 180 degree, then the liquid is completely unable to dampen the object surface, and so in this situation through the modification of the material and structure of surface structure 11 the contact angle can be varied so as to achieve the self-cleansing effect.

When a nano layer is coated on the surface structure 11, such as coating a 50 nm thick titanium-oxide coating, then under the effect of ultra-violet light will accelerate the breakdown of organic substance. Thereby the broken down organic substance can be washed away without leaving water-mark, thereby achieve the self-cleansing effect. In another embodiment when the surface structure 11 is a photo-catalyst, then the function of anti-bacteria, deodorizing, and air purification can be achieved. Photo-catalyst uses light as a catalyst, so that after absorbing the energy of light, catalyst effect can be produced, so as to trigger elements with catalyst characteristic; such as locating a nano level photo-catalyst on the surface of the surface structure 11, such as titanium-dioxide ($TiO_2$), this material after being activated by light will turn surrounding oxygen and water molecules into $H_{2-}$ and $O_{2-}$ free negative ions (free radicals) that excels at oxidizing. It is capable of breaking down all organic or inorganic substance harmful to the human body or environment, and not only accelerates oxidizing effect, but can also minimize wasting of resource and avoid contributing to pollution.

When the surface structure 11 is set with optical effect functions, the micro structure shape that forms the surface structure 11 is generally sphere shaped, hemisphere shaped, prism shaped or pyramid shaped, lenticular shaped, Fresnel lens shaped, or a combination of shapes and structures that can diffuse light. The micro structure can be dispersed evenly or randomly, so as to avoid overlapping with other components and lead to moiré pattern. The functions of the surface structure 11 is to mix-up the light path of exiting light, increase optical path, and improve upon the uniformity of light. Furthermore, during the manufacturing process of forming surface structure 11, diffusion particles 110 can be added so as to increase diffusion of light. The diffusion particles 110 can be selected from polymers of acrylic, silica, or titanium dioxide or combination thereof; and the goal is to utilize the difference in refraction variations to reflect and scatter light. The shape of the particles can be strip-shaped, near elliptical or round shaped. The size of the particles can be adjusted according to Rayleigh scattering model and Mie scattering model. The scattering diffusion particles 110 can be birefringence high polymer, and the diffusion particles 110 can be mixed internally within optical cement that is used for coating.

[Third Embodiment]

Figure 3:
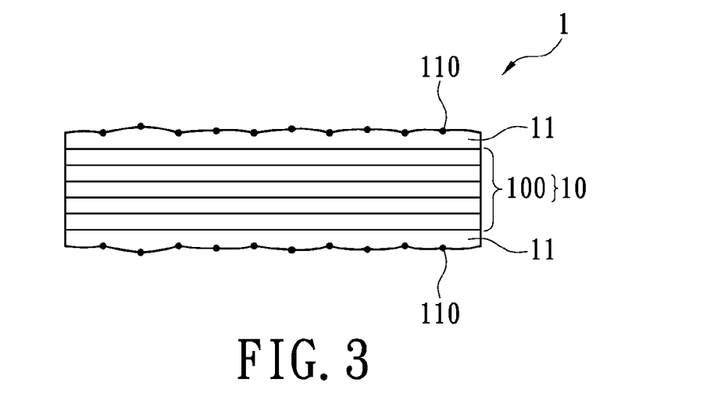
FIG. 3 shows a side-view diagram of a light-polarizing reflection unit according to a third embodiment of the instant disclosure.

Also, reference FIG. 3, the significant difference from the second embodiment (as shown by FIG. 2) is that the first surface and the second surface of the multilayer reflector 10 forms a surface structure 11, and the surface structure 11 is mixed with a plurality of diffusion particles 110. For example, the surface structure 11 that is mixed with a plurality of diffusion particles 110 can through any formation method, form on the first surface and the second surface of the multilayer reflector 10. Thereby, the surface structure 11 mixed with a plurality of diffusion particles 110 can simultaneously form on the first and second surface of the multilayer reflector 10. Furthermore, the user may also selectively add the aforementioned microstructure 11a which can be a self-cleansing layer or a photo-catalyst layer.

[Fourth Embodiment]

Figure 4:
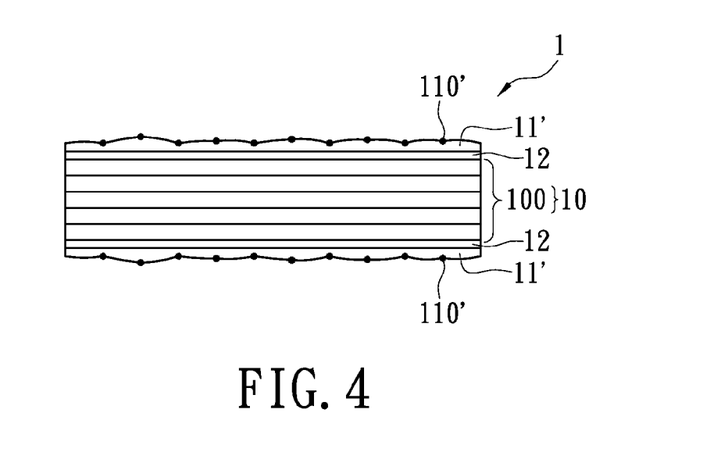
FIG. 4 shows a side-view diagram of a light-polarizing reflection unit according to a fourth embodiment of the instant disclosure.

Reference FIG. 4 the significant difference from the third embodiment (as shown by FIG. 3) is that the surface structure 11 mixed with a plurality of diffusion particles 110 can be replaced with a diffusion membrane (or a amplification membrane) mixed with a plurality of diffusion particles 110'. In other words, the first surface or second surface of the multilayer reflector 10 can be laminated with a diffusion membrane (or an amplification membrane) 11', and the diffusion membrane (or amplification membrane) 11' is mixed with a plurality of diffusion particles 110'. For example, FIG. 4 shows both sides of inter-stacked polymer films 100 of the multilayer reflector 10 utilizing optical cement to laminate with substrate 12, which includes the aforementioned first surface and second surface, thereby both the upper and lower side forms corresponding surface structure via coating; and by the same reasoning the diffusion particles 110' can be formed at the same time, thereby forming a diffusion membrane (or amplification membrane) 11', which is capable of increasing the diffusion effect of the multilayer reflector 10. Therein the plastic material used to form the surface structure of substrate 12 for supporting the multilayer reflector structure can be but not limited to the following: polycarbonate (PC), polypropylene (PP), polystyrene (PS), polymethylmethacrylate (PMMA), methylmethacrylate styrene (MS), acrylonitrile butadiene styrene (ABS), polyethylene terephthalate (PET), polyoxymethylene (POM), nylon, polyethylene naphthalate (PEN), or CoPEN or CoPET that is a combination of PET and PEN mixed in specific ratio, ethylene-tetrafluoroethylene (ETFE), or polyactide (PLA).

Furthermore, in regard to the aforementioned manufacturing process of the multilayer reflector 10, at least include the following steps:

First, using co-extrusion process to form a multilayer reflector 10 via a plurality of inter-stacked polymer films 100, wherein a single or multiple extrusion machine can respectively transport various polymer materials into a co-extrusion mold; after extrusion and stacking the multilayer film is formed, which after steps of cooling for form setting, retrieval, and truncating, the multilayer reflector 10 is formed, and its surface structure may also be formed at this time. After extrusion and before form setting, an online or offline single-axial stretching formation can be done, so as to form optical elements with polarization effect; or an online or offline bi-axial stretching formation can be done, so as to control the P and S polarization ratio of the multilayer reflector 10, or form a multilayer reflector 10 that has no polarization; this is because stretching formation changes the physical characteristic of the multilayer reflector 10, so that optical elements targeted at specific wavelength range can be produced; and according to the stretching ratio of the single-axial or bi-axial the polarization effect can be varied. Lastly, a surface structure can be form on the multilayer reflector 10. The surface structure can be formed via coating or laminating on the multilayer reflector 10, and functionality can be added via coating, such as adding a self-cleansing layer or photo-catalyst layer on the surface of the multilayer reflector 10. In other words, the present embodiment can selectively add the aforementioned microstructure layer 11a that can be a self-cleansing layer or a photo-catalyst layer.

[Fifth Embodiment]

Figure 5:
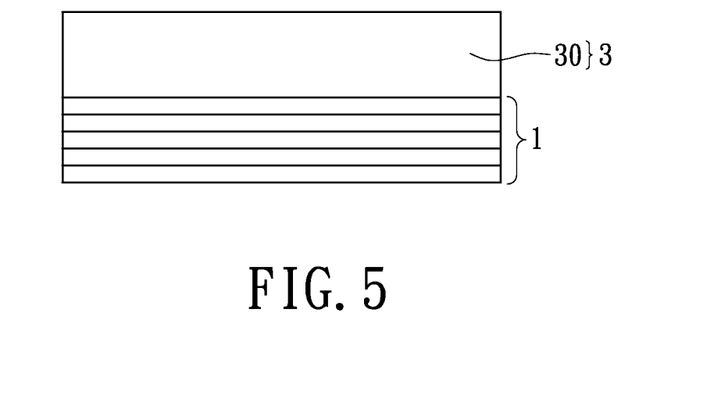
FIG. 5 shows a side-view diagram of a light-polarizing reflection unit according to a fifth embodiment of the instant disclosure.

Reference FIG. 5, the significant difference from the first embodiment (as shown by FIG. 1A) is that the light-uniforming anti-glaring structure further includes: a light-polarizing absorption unit 3, which comprises at least a light-polarizing absorption strip 30 that mutually laminates with the light-uniforming anti-glaring structure 1. Furthermore, the present embodiment can selectively add the aforementioned microstructure layer 11a that can be a self-cleansing layer or a photo-catalyst layer.

[Sixth Embodiment]

Figure 6:
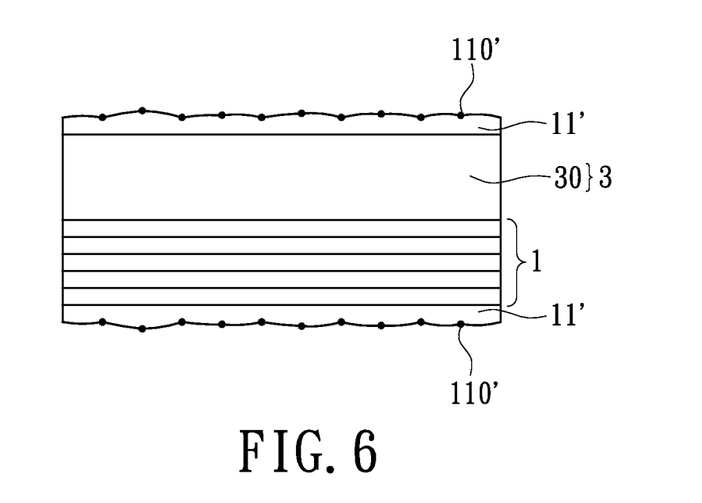
FIG. 6 shows a side-view diagram of a light-polarizing reflection unit according to a sixth embodiment of the instant disclosure.

Reference FIG. 6, the significant difference from the fourth embodiment (as shown by FIG. 4) is that the light-polarizing absorption strip 30 can form or laminate a diffusion membrane (or amplification membrane) 11'. Furthermore, the present embodiment can selectively add the aforementioned microstructure layer 11a that can be a self-cleansing layer or a photo-catalyst layer.

[Seventh Embodiment]

Figure 7:
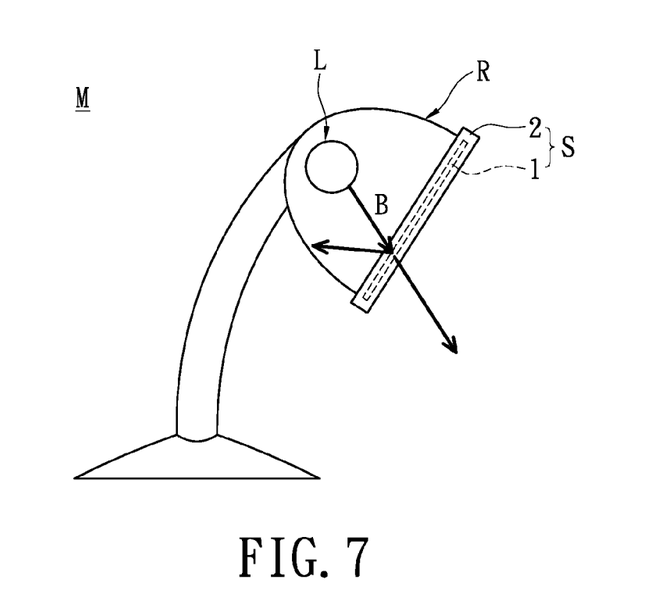
FIG. 7 shows a side-view diagram of a first type of light emitting device utilizing a light-uniforming anti-glaring structure according to the seventh embodiment of the instant disclosure.

Reference FIG. 7, the aforementioned light-uniforming anti-glaring structure S from the various embodiments can be utilized within a light emitting device M, wherein the light emitting device M includes: a light emitting unit L, a reflection unit R, a light-polarizing reflection unit 1, and a light-polarizing position adjusting unit 2, and the light emitting device M can be a lamp. Additionally, there can be a light-polarizing absorption strip 30 that mutually laminates with the light-polarizing reflection unit 1 (not shown in figure). Furthermore, the present embodiment can selectively add the aforementioned microstructure layer 11a that can be a self-cleansing layer or a photo-catalyst layer.

Therein, the light emitting unit L can be a cold-cathode fluorescent lamp (CCFL), a light-emitting diode (LED), an organic electroluminescent device (OELD), a laser device, a photoluminescence emission device (PLED), an external electrode fluorescent lamp (EEFL), a flat fluorescent lamp (FFL), a carbon nanotubes field emission luminescent device, a halogen lamp, an xenon lamp, or a high pressure mercury lamp.

Furthermore, the reflection unit R is located at one side of the light emitting unit L, so as to reflect the light beam B generated by the light emitting unit L. The light-polarizing reflection unit 1 is located at the other side of the light emitting unit L, so as to selectively receive or reflect that light beam B generated by the light emitting unit L. As shown in FIG. 1A, the light-polarizing reflection unit 1 includes at least one multilayer reflector 10 composed of a plurality of inter-stacked polymer films 100, wherein at least one layer of the inter-stacked polymer films is a birefringence material layer that conforms to the condition of NX≠NY≠NZ, such that NX is the index of refraction of light at X direction, NY is the index of refraction of light at Y direction, and NZ is the index of refraction of light at Z direction.

Furthermore, the light-polarizing position adjusting unit 2 is coupled with the light-polarizing reflection unit 1, so as to adjust the position of the light-polarizing reflection unit 1. The structure of the light-polarizing position adjusting unit 2 is as described in FIG. 1B to 1E.

[Eight Embodiment]

Figure 8:
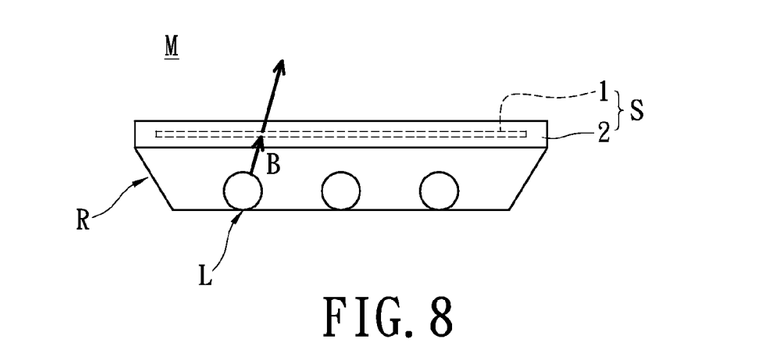
FIG. 8 shows a side-view diagram of a second type of light emitting device utilizing a light-uniforming anti-glaring structure according to the eighth embodiment of the instant disclosure.

Reference FIG. 8, the aforementioned light-uniforming anti-glaring structure S from the various embodiments can be utilized within a light emitting device M, wherein the light emitting device M includes: a light emitting unit L, a reflection unit R, a light-polarizing reflection unit 1, and a light-polarizing position adjusting unit 2, and the light emitting device M can be a direct-type backlight module. The light emitting device M utilizes a direct-type backlight module as light source, the brightness of the direct-type backlight module is typically greater than side-type backlight module; in consideration of the uniformity of the light source, a diffusor or diffusion membrane can be installed inside the direct-type backlight module for making the light more uniform. The light source of a direct-type backlight module can be a cold-cathode fluorescent lamp (CCFL), a light-emitting diode (LED), a laser device, an organic electroluminescent device (OELD), a photoluminescence emission device (PLED), an external electrode fluorescent lamp (EEFL), a flat fluorescent lamp (FFL), a carbon nanotubes field emission luminescent device, a halogen lamp, an xenon lamp, or a high pressure mercury lamp. Additionally, there can be a light-polarizing absorption strip 30 that mutually laminates with the light-polarizing reflection unit 1 (not shown in figure).

[Ninth Embodiment]

Figure 9:
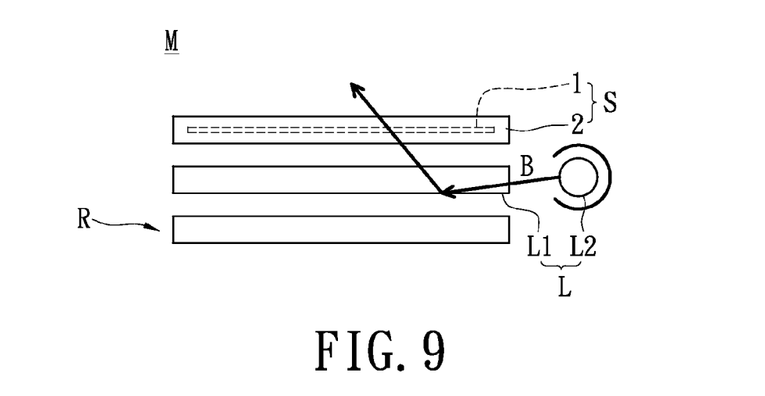
FIG. 9 shows a side-view diagram of a third type of light emitting device utilizing a light-uniforming anti-glaring structure according to the ninth embodiment of the instant disclosure.

Reference FIG. 9, the aforementioned light-uniforming anti-glaring structure S from the various embodiments can be utilized within a light emitting device M, wherein the light emitting device M includes: a light emitting unit L, a reflection unit R, a light-polarizing reflection unit 1, and a light-polarizing position adjusting unit 2, and the light emitting device M can be a side-type backlight module. The side-type backlight module uses a light guiding unit such as a light guiding board for guiding light, the body size and thickness is generally thinner than direct-type backlight module that utilizes diffusor board or membrane. Also, there can be a light-polarizing absorption strip 30 that mutually laminates with the light-polarizing reflection unit 1 (not shown in figure). As an example, the light emitting unit L comprises at least a light guiding unit L1 facing the light-polarizing reflection unit 1 and a light emitting element L2 located at one side of the light guiding unit L1. The light emitting element L2 can be a cold-cathode fluorescent lamp (CCFL), a light-emitting diode (LED), a laser device, an organic electroluminescent device (OELD), a photoluminescence emission device (PLED), an external electrode fluorescent lamp (EEFL), a flat fluorescent lamp (FFL), a carbon nanotubes field emission luminescent device, a halogen lamp, an xenon lamp, or a high pressure mercury lamp.

[Effects of the Embodiments]

The embodiments of the instant disclosure provide a light-uniforming and anti-glaring structure, which can adjust for conditions of polarization that occurs when light beam passes through multilayer reflector, so that the effect of glare upon a user is greatly decreased.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A light-uniforming anti-glaring structure, comprising:
   a light-polarizing reflection unit including at least one multilayer reflector composed of a plurality of inter-stacked polymer films, wherein at least one layer of the inter-stacked polymer films is a birefringence material layer that conforms to the condition of NX≠NY≠NZ, wherein NX is the index of refraction of light at X direction, NY is the index of refraction of light at Y direction, and NZ is the index of refraction of light at Z direction; and
   a light-polarizing position adjusting unit coupled to the light-polarizing reflection unit for adjusting the position of the light-polarizing reflection unit;
   wherein the light-polarizing position adjusting unit includes a position adjusting ring surrounding the multilayer reflector for driving the multilayer reflector to rotate in 360 degrees, or for driving the multilayer reflector to flip-flop clock-wise or counter-clock-wise.

2. The light-uniforming anti-glaring structure according to claim 1, wherein the multilayer reflector has a surface structure from on at least one surface thereof, and the surface structure is mixed with a plurality of diffusion particles.

3. The light-uniforming anti-glaring structure according to claim 1, wherein at least one surface of the multilayer reflector has a diffusion membrane or an amplification membrane, and the diffusion membrane or the amplification membrane is mixed with a plurality of diffusion particles.

4. The light-uniforming anti-glaring structure according to claim 1, wherein at least one layer of the inter-stacked polymer films is a ultra-violet reflector for reflecting ultra-violet lights.

5. The light-uniforming anti-glaring structure according to claim 1, wherein the multilayer reflector is formed through single-axial or bi-axial stretching, so that the average transmittance rate of the multilayer reflector for light spectrum 380 nm~780 nm is selectively between 30% and 90%.

6. The light-uniforming anti-glaring structure according to claim 1, wherein the multilayer reflector is formed through bi-axial stretching, so that the multilayer reflector is selectively polarized or non-polarized.

7. The light-uniforming anti-glaring structure according to claim 1, wherein at least one surface of the multilayer reflector forms a micro structure layer.

8. The light-uniforming anti-glaring structure according to claim 7, wherein the microstructure layer is a self-cleansing layer or a photo-catalyst layer.

9. The light-uniforming anti-glaring structure according to claim 7, wherein the micro structure layer is prism shaped, pyramid shaped, hemisphere shaped, aspheric shaped, Frensel lens shaped, or grating structured, or a combination thereof.

10. The light-uniforming anti-glaring structure according to claim 1, further comprising: a light-polarizing absorption unit includes at least a light- polarizing absorption strip that mutually laminates with the light-polarizing reflection unit, wherein the surface of the light-polarizing absorption strip has a diffusion membrane or an amplification membrane, and the diffusion membrane or the amplification membrane is mixed with a plurality of diffusion particles.

11. The light-uniforming anti-glaring structure according to claim 10, wherein the multilayer reflector is fixedly connected with the position adjusting ring.

12. A light emitting device, comprising:
a light emitting unit;
a reflection unit located at one side of the light emitting unit, so as to reflect light beams produced by the light emitting unit;
a light-polarizing reflection unit located at the other side of the light emitting unit, so as to receive or reflect the light beams from the light emitting unit, wherein the light-polarizing reflection unit comprises at least one multilayer reflector composed of a plurality of inter-stacked polymer films, wherein at least one layer of the inter-stacked polymer films is a birefringence material layer that conforms to the condition of NX≠NY ≠NZ, wherein NX is the index of refraction of light at X direction, NY is the index of refraction of light at Y direction, and NZ is the index of refraction of light at Z direction; and
a light-polarizing position adjusting unit, coupled to the light-polarizing reflection unit for adjusting the position of the light-polarizing reflection unit;
wherein the light-polarizing position adjusting unit includes a position adjusting ring surrounding the multilayer reflector for driving the multilayer reflector to rotate in 360 degrees, or for driving the multilayer reflector to flip-flop clock-wise or counter-clock-wise.

13. The light emitting device according to claim 12, wherein the light emitting unit is a cold-cathode fluorescent lamp, a light-emitting diode, an organic electroluminescent device, a laser device, a photoluminescence emission device, an external electrode fluorescent lamp, a flat fluorescent lamp, a carbon nanotubes field emission luminescent device, a halogen lamp, an xenon lamp, or a high pressure mercury lamp.

14. The light emitting device according to claim 12, wherein the light emitting unit comprises at least a light guiding unit facing the light-polarizing reflection unit and a light emitting element located at one side of the light guiding unit.

15. The light emitting device according to claim 12, further comprising a light-polarizing absorption unit includes at least a light-polarizing absorption strip that mutually laminates with the light-polarizing reflection unit.

16. The light emitting device according to claim 12, wherein the surface of the light-polarizing reflection unit is located with a microstructure layer.

17. The light emitting device according to claim 16, wherein the microstructure layer includes a self-cleansing layer or a photo-catalyst layer.

18. The light emitting device according to claim 16, wherein the micro structure layer is prism shaped, pyramid shaped, hemisphere shaped, aspheric shaped, Frensel lens shaped, or grating structured, or a combination thereof.

19. The light emitting device according to claim 12, wherein the multilayer reflector is fixedly connected with the position adjusting ring.

20. A light-uniforming anti-glaring structure, comprising:
a multilayer reflector composed of a plurality of inter-stacked polymer films, wherein at least one of the inter-stacked polymer films is a birefringence material layer that conforms to the condition of NX≠Ny≠NZ, wherein NX is the index of refraction of light at X direction, NY is the index of refraction of light at Y direction, and NZ is the index of refraction of light at Z direction; and
a position adjusting ring coupled to the multilayer reflector for driving the multilayer reflector to rotate in 360 degrees, wherein the multilayer reflector is divided into a plurality of reflector strips surrounded by the position adjusting ring, and each of the reflector strips is flip-flopped relative to the position adjusting ring.

21. The light-uniforming anti-glaring structure according to claim 20, further comprising: a plurality of rotational axles respectively passing through the reflector strips.

* * * * *